(12) United States Patent
Lin et al.

(10) Patent No.: US 10,896,784 B2
(45) Date of Patent: Jan. 19, 2021

(54) DIRECT MICROWAVE PRODUCTION OF GRAPHENE

(71) Applicant: Nanotek Instruments, Inc., Dayton, OH (US)

(72) Inventors: Yi-Jun Lin, Taoyuan (TW); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 350 days.

(21) Appl. No.: 15/475,451

(22) Filed: Mar. 31, 2017

(65) Prior Publication Data

US 2018/0286599 A1      Oct. 4, 2018

(51) Int. Cl.
*H01G 11/50* (2013.01)
*H01M 4/587* (2010.01)
(Continued)

(52) U.S. Cl.
CPC ............ *H01G 11/50* (2013.01); *B01J 19/126* (2013.01); *B01J 19/129* (2013.01); *C01B 32/192* (2017.08); *H01G 11/32* (2013.01); *H01G 11/86* (2013.01); *H01M 4/587* (2013.01); *H01M 4/625* (2013.01); *B01J 2219/089* (2013.01); *B01J 2219/1278* (2013.01); *B82Y 40/00* (2013.01);
(Continued)

(58) Field of Classification Search
CPC ..... H01M 4/587; H01M 4/625; C01B 32/192; H01G 11/50; H01G 11/32; H01G 11/86; B01J 19/129; B01J 2219/089; B01J 2219/1278; B01J 19/126; C01P 2006/40; B82Y 40/00; B82Y 30/00; Y10S 977/734; Y10S 977/842; Y10S 977/948; Y02E 60/13; Y02P 20/542
See application file for complete search history.

(56) References Cited

U.S. PATENT DOCUMENTS 6,872,330 B2   3/2005   Mack et al.
7,071,258 B1   7/2006   Jang
(Continued)

FOREIGN PATENT DOCUMENTS

CN           102290255 B       1/2013

OTHER PUBLICATIONS

Krishnamoorthy, et al., The chemical and structural analysis of graphene oxide with different degrees of oxidation, Carbon 2013; 53: 38-49 (Year: 2013).*

(Continued)

*Primary Examiner* — Daniel C. McCracken

(57) ABSTRACT

Provided is a method of producing graphene directly from a non-intercalated and non-oxidized graphitic material, comprising: (a) dispersing the graphitic material in a liquid solution to form a suspension, wherein the graphitic material has never been previously exposed to chemical intercalation or oxidation; and (b) subjecting the suspension to microwave or radio frequency irradiation with a frequency and an intensity for a length of time sufficient for producing graphene; wherein the liquid solution contains a metal salt dissolved in water, organic solvent, ionic liquid solvent, or a combination thereof. The method is fast (minutes as opposed to hours or days of conventional processes), environmentally benign, and highly scalable.

17 Claims, 2 Drawing Sheets

(51) Int. Cl.
  *B01J 19/12* (2006.01)
  *C01B 32/192* (2017.01)
  *H01M 4/62* (2006.01)
  *H01G 11/86* (2013.01)
  *H01G 11/32* (2013.01)
  *B82Y 40/00* (2011.01)

(52) U.S. Cl.
  CPC ........... *C01P 2006/40* (2013.01); *Y02E 60/13* (2013.01); *Y02P 20/54* (2015.11); *Y10S 977/734* (2013.01); *Y10S 977/842* (2013.01); *Y10S 977/948* (2013.01)

(56) References Cited

U.S. PATENT DOCUMENTS

| | | | |
|---|---|---|---|
| 8,747,623 | B2 | 6/2014 | Zhamu et al. |
| 2004/0127621 | A1 | 7/2004 | Drzal et al. |
| 2006/0148965 | A1 | 7/2006 | Drzal et al. |
| 2012/0064409 | A1* | 3/2012 | Zhamu ............... B82Y 30/00 429/221 |
| 2013/0087446 | A1* | 4/2013 | Zhamu ............... B82Y 40/00 204/157.43 |
| 2013/0102084 | A1* | 4/2013 | Loh ................. B01J 21/185 436/94 |

OTHER PUBLICATIONS

Periodic Table Atomic Properties of the Elements NIST SP 966 (Sep. 2003) (Year: 2003).*

Niu, et al., Salt-assisted direct exfoliation of graphite into high-quality, large-size, few-layer graphene sheets, Nanoscale 2013; 5: 7202-7208 (Year: 2013).*

Gautam "Preparation of Exfoliated Graphite by Microwave Irradiation and Its Further Use in Multilayer Graphene Synthesis" Conference Proceeding, Bhabha Atomic Research Center, Mumbai (2012) https://www.researchgate.net/publication/301694477, 3 pages.

PCT/US18/20561—International Search Report and Written Opinion dated Apr. 30, 2018, 7 pages.

Bor Z. Jang and A Zhamu, "Processing of Nano Graphene Platelets (NGPs) and NGP Nanocomposites: A Review," J. Materials Sci. 43 (2008) 5092-5101.

Yang, et al. "Two-dimensional Graphene Nano-ribbons," J. Am. Chem. Soc. 130 (2008) 4216-17.

* cited by examiner

DIRECT MICROWAVE PRODUCTION OF GRAPHENE

FIELD OF THE INVENTION

The present invention relates to a method of producing graphene materials. The method combines intercalation, exfoliation, separation, and reduction of graphene sheets in one step, dramatically shortening the time to produce graphene and significantly reducing the amount of chemicals used.

BACKGROUND

A single-layer graphene sheet is composed of carbon atoms occupying a two-dimensional hexagonal lattice. Multi-layer graphene is a platelet composed of more than one graphene plane of carbon atoms. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene(<5% by weight of fluorine), graphene fluoride ((≥5% by weight of fluorine), other halogenated graphene, hydrogenated graphene, and chemically functionalized graphene.

Graphene has been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was world's first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). Prior to intercalation or oxidation, graphite has an inter-graphene plane spacing of approximately 0.335 nm ($L_d=½ d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this chemical production process:

(1) The process requires the use of large quantities of several undesirable chemicals, such as sulfuric acid, nitric acid, and potassium permanganate or and sodium chlorate.

(2) The chemical treatment process requires a long intercalation and oxidation times, typically 5 hours to five days.

(3) Strong acids consume a significant amount of graphite during this long intercalation/oxidation process by "eating their way into the graphite" (converting graphite into carbon dioxide, which is lost in the process). It is not unusual to lose 20-50% by weight of the graphite material immersed in strong acids and oxidizers.

(4) The thermal exfoliation requires a high temperature (typically 800-1,050° C.) and, hence, is a highly energy-intensive process.

(5) Both heat- and solution-induced exfoliation approaches require a very tedious washing and purification step. For instance, typically 2.5 kg of water is used to wash and recover 1 gram of GIC, producing huge quantities of waste water that need to be properly treated.

(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to address these issues.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [[B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Microwaves have been used to assist the production of exfoliated graphite (graphite worms), graphite nano platelets (or expanded graphite), and graphene. For instance, L. Drzal, et al ["Expanded Graphite and Products Produced Therefrom," US Pub. No. 20040127621 (Jul. 1, 2004) and US 20060148965 (Jul. 6, 2006)] use microwave to produce exfoliated graphite nanoplatelets. In this prior art process, microwave was used after natural graphite had been fully intercalated and oxidized with the conventional strong acid/oxidizer treatments, and after the intercalated powder had been repeatedly rinsed, dried, and recovered from the liquid. This dried powder was GIC or GO, which had been heavily oxidized with their structure chemically altered and damaged. Microwave heating was used to simply replace furnace heating to more energy-efficiently heat the GIC for decomposing the interstitial sulfuric acid or nitric acid species residing inside graphite.

The thermally induced decomposition products are volatile gases (such as $NO_x$ and $SO_x$) that exert high internal gas pressure to push apart neighboring graphene sheets, a process commonly referred to as exfoliation. The sequence of this prior art approach is clearly explained in various places in Drzal's patent applications, including the Abstract and all the examples presented. This approach still suffers from the aforementioned seven (7) major problems, except for the notion that microwave might be more energy efficient as compared to tube furnace heating for the purpose of exfoliating already pre-intercalated graphite. This energy efficiency appears to be the main incentive for Drzal et al to use microwave energy, instead of furnace heating, to thermally exfoliate their GIC/GO.

Zhu, et al. used microwaves to assist in both the exfoliation and reduction of dried graphite oxide powders [Yanwu Zhu, et al.' "Microwave assisted exfoliation and reduction of graphite oxide for ultracapacitors," Carbon, Vol. 48, Issue 7, June 2010, Pages 2118-2122]. Graphite has been oxidized and intercalated to produce GO/GIC. This process suffers from the same drawbacks as the Drzal's process. The same problems are also associated with the work by Khavrel, et al. [P. A. Khavrel, et al., "Fluorinated microwave exfoliated graphite oxide: structural features and double layer capacitance," Fullerenes, Nanotubes and Carbon Nanostructures, Volume 24, 2016—Issue 4] and by Voiry, et al. [Damien Voiry, et al., "High-quality graphene via microwave reduction of solution-exfoliated graphene oxide," Science, 23 Sep. 2016: Vol. 353, Issue 6306, pp. 1413-1416].

Chen, et al. used a combination of microwaves and a chemical reducing agent to reduce graphene oxide in a solution state [Wufeng Chen, Lifeng Yan, Prakriti R. Bangal, "Preparation of graphene by the rapid and mild thermal reduction of graphene oxide induced by microwaves," Carbon, Volume 48, Issue 4, April 2010, Pages 1146-1152]. The graphene oxide sheets had been pre-produced using heavy oxidation of graphite and separation of individual graphene oxide sheets using solution ultrasonication.

Our research group makes use of a combination of microwaves and some strong acids to directly produce graphene sheets from non-oxidized and non-intercalated graphite [A. Zhamu and Bor Z. Jang, "One-Step Production of Graphene Materials," U.S. patent application Ser. No. 13/317,100 (Oct. 11, 2011); now U.S. Pat. No. 8,747,623 (Jun. 10, 2014)]. A few years later, Matsumoto, et al. use a combination of microwaves and a specific group of oligomeric ionic liquids to directly produce graphene from natural graphite [Michio Matsumoto, Yusuke Saito, Chiyoung Park, Takanori Fukushima, & Takuzo Aida,' "Ultrahigh-throughput exfoliation of graphite into pristine 'single-layer' graphene using microwaves and molecularly engineered ionic liquids," *Nature Chemistry*, 7 (2015) 730-735]. This group of ionic liquids is difficult to produce and is very expensive, not conducive to large-scale production.

Hence, an urgent need exists to have a graphene production process that requires a reduced amount of undesirable chemical or expensive chemical, shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets.

SUMMARY OF THE INVENTION

The present invention provides a strikingly simple, fast, scalable, environmentally benign, and cost-effective process that meets the aforementioned needs. This method of producing graphene from a graphitic or carbonaceous material comprises subjecting a suspension (containing a graphitic or carbonaceous material dispersed in a metal salt solution) to microwaves for a length of time sufficient for producing graphene. Preferably, the starting material (graphitic or carbonaceous material) has never been previously intercalated or chemically oxidized. This starting material is not a graphite intercalation compound (GIC) or graphite oxide (GO). This is essentially a single-step process. After graphite powder is dispersed in a solution (it takes less than 1 minute to disperse), the resulting suspension is immediately exposed to microwaves. In less than another 45 minutes, graphite is fully exfoliated and separated to form graphene sheets. This process is stunningly short and simple. Both household microwave ovens and industrial-scale microwave equipment built for heating or drying materials can be used for practicing the instant invention. It typically takes 2 or 3 times shorter time to complete the instant production method if an industrial-scale microwave apparatus is operated.

An embodiment of the present invention is a method of producing graphene directly from a non-intercalated and non-oxidized graphitic material. The method comprises: (a) dispersing a graphitic material in a liquid solution to form a suspension, wherein the graphitic material has never been previously exposed to chemical intercalation or oxidation; and (b) subjecting the suspension to microwave or radio frequency irradiation with a frequency and an intensity for a length of time sufficient for producing graphene; wherein the liquid solution contains a metal salt dissolved in water, organic solvent, ionic liquid solvent, or a combination thereof.

The metal salt preferably contains a metal halide salt or a lithium salt, sodium salt, or potassium salt that contains a halogen element (e.g. F, Cl, Br, or I), B, or N.

For instance, the metal salt may contain a metal halide selected from the group consisting of MCl (M=Li, Na, K, Cs), $MCl_2$ (M=Zn, Ni, Cu, Mn), $MCl_3$ (M=Al, Fe, Ga), $MCl_4$ (M=Zr, Pt), $MF_2$ (M=Zn, Ni, Cu, Mn), $MF_3$ (M=Al, Fe, Ga), $MF_4$ (M=Zr, Pt), and combinations thereof.

In certain preferred embodiments, the metal salt includes an alkali metal salt selected from lithium perchlorate ($LiClO_4$), sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN($CF_3SO_2$)$_2$), sodium trifluoromethanesulfonimide (NaTFSI), bis-trifluoromethyl sulfonylimide potassium (KN($CF_3SO_2$)$_2$), a sodium ionic liquid salt, lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

Preferably, the organic solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, or a combination thereof.

The starting graphitic material may be selected from natural graphite, synthetic graphite, highly oriented pyrolytic graphite, meso-carbon micro-bead, graphitized mesophase carbon, needle coke, carbon fiber, graphite fiber, carbon nano-fiber, graphitic nano-fiber, graphite fluoride, chemically modified graphite, expanded graphite, or a combination thereof.

With the above starting materials, solvent, and metal salt, the required microwave or radio frequency irradiation time for graphene production is less than 60 minutes, preferably and typically less than 30 minutes, and most typically less than 10 minutes.

In certain embodiments, the microwave or radio frequency irradiation is followed by a mechanical shearing treatment to produce a thinner or smaller graphene material. The mechanical shearing treatment may comprise using air milling, air jet milling, ball milling, rotating-blade mechanical shearing, ultrasonication, cavitation or a combination thereof.

In certain embodiments, the liquid solution further comprises a chemical functionalizing agent and the microwave or radio frequency irradiation activates a chemical reaction between the agent and graphene to produce a chemically functionalized graphene material.

The method is capable of producing single-layer graphene sheets. The produced graphene materials con contain at least 80% single-layer graphene sheets, often more than 90%.

The produced graphene materials can contain pristine graphene, oxidized graphene with less than 5% oxygen content by weight, graphene fluoride, graphene fluoride with less than 5% fluorine by weight, graphene with a carbon content no less than 95% by weight, or functionalized graphene.

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber, etc.

One preferred specific embodiment of the present invention is a method of producing a graphene material (also referred to as nano graphene platelet, NGP) that is essentially composed of a sheet of graphene plane or multiple sheets of graphene plane stacked and bonded together (typically, on an average, up to five sheets per multi-layer platelet). Each graphene plane, also referred to as a graphene sheet, comprises a two-dimensional hexagonal structure of carbon atoms. Each platelet has a length and a width parallel to the graphene plane and a thickness orthogonal to the graphite plane. By definition, the thickness of an NGP is 100 nanometers (nm) or smaller, with a single-sheet NGP being as thin as 0.34 nm. However, the presently invented method produces graphene sheets that are typically from 1 to 5 layers, or from 0.34 nm to 1.7 nm. The length and width of a NGP are typically between 200 nm and 20 µm, but could be longer or shorter.

Figure 2A:
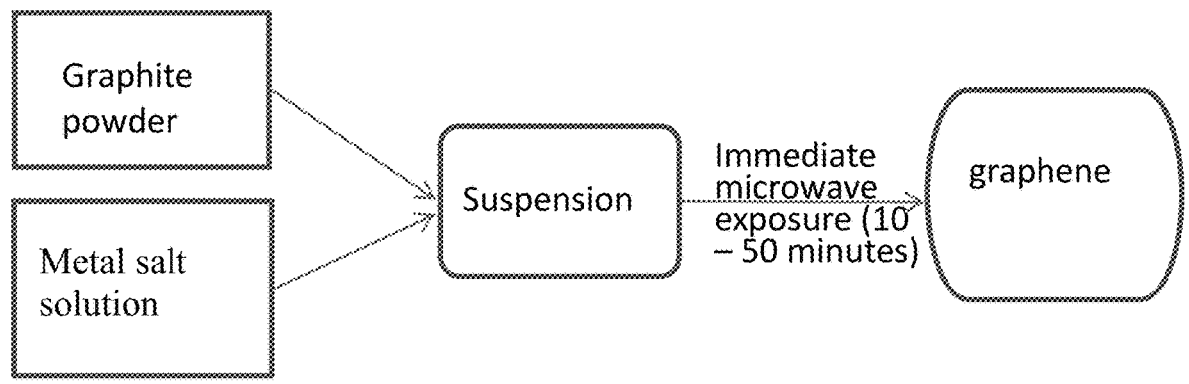
FIG. 2(A) Flowchart to illustrate presently invented one-step process.

The present invention provides a strikingly simple, fast, scalable, environmentally benign, and cost-effective process that avoids essentially all of the drawbacks associated with prior art processes. As schematically illustrated in FIG. 2(A), one preferred embodiment of this method entails subjecting a suspension (containing a graphitic material dispersed in a metal salt solution) to microwave or radio frequency irradiation for a length of time sufficient for producing the exfoliated graphite or graphene. This is essentially a single-step process. After graphite powder is dispersed in a select solution, the resulting suspension is immediately exposed to microwave irradiation. In less than another 50 minutes (typically less than 30 minutes, and often less than 10 minutes), graphite is fully exfoliated, forming mostly single-layer graphene and, in some cases, some few-layer graphene (mostly no more than 5 layers). This process is stunningly short and simple. The metal salt preferably contains a metal halide salt or a lithium salt, sodium salt, potassium salt that contains a halogen element (e.g. F, Cl, Br, or I), B, N, or a combination thereof. Preferred metal salts and solvents that can be used are summarized in later paragraphs of this section.

Figure 1:
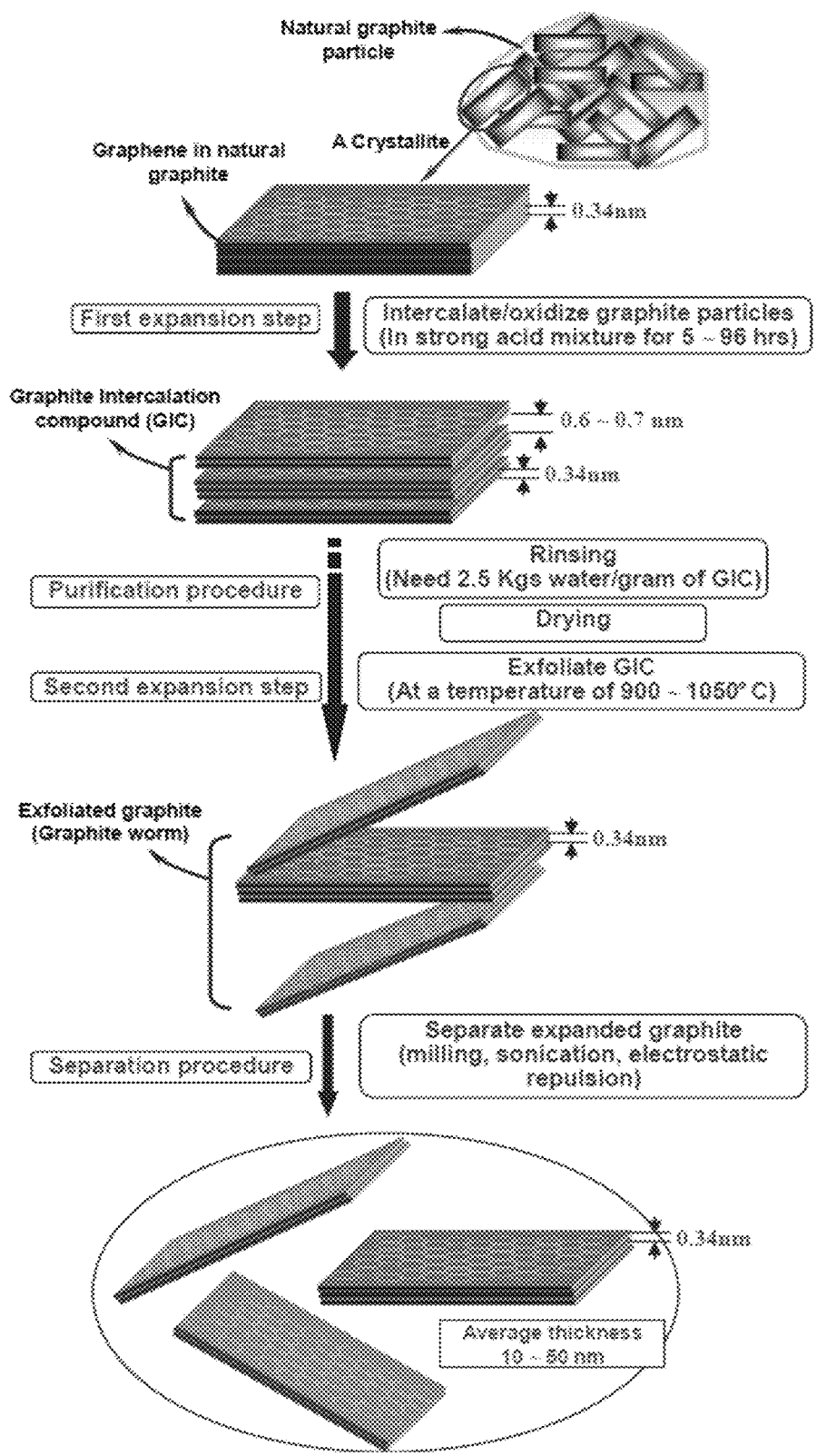
FIG. 1 A flow chart showing the most commonly used prior art process of producing highly oxidized NGPs that entails tedious chemical oxidation/intercalation, rinsing, and high-temperature exfoliation procedures.
Figure 2B:
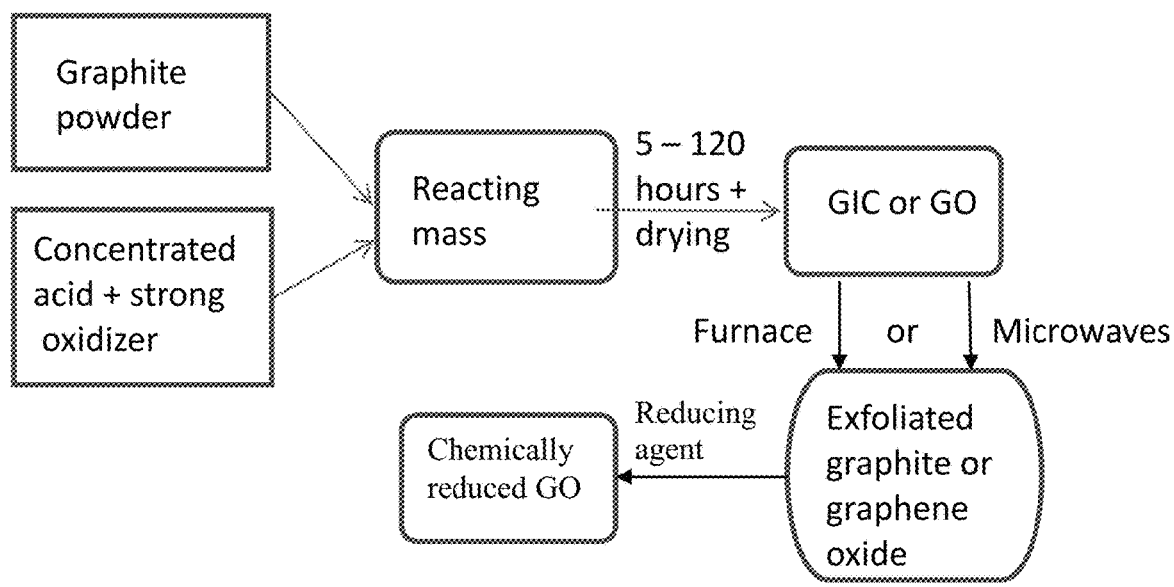
FIG. 2(B) Flow chart for the conventional, multi-step process of producing graphene materials.

In contrast, as shown in FIG. 1 and FIG. 2(B), the prior art chemical processes typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished in two ways. One is to expose the GIC to a furnace pre-set at a temperature of typically 800-1100° C. (more typically 950-1050° C.). The other is to expose the GIC to microwave irradiation, as disclosed in the patent applications of L. Drzal, et al ["Expanded Graphite and Products Produced Therefrom," US Pub. No. 20040127621 (Jul. 1, 2004 and US 20060148965 (Jul. 6, 2006)].

It is again critically important to recognize that Drzal et al use microwave to produce exfoliated graphite nanoplatelets from GIC (not from the starting graphite, as in our invention) after natural graphite has been fully intercalated and oxidized with the conventional strong acid treatments, and after the intercalated powder had been dried and recovered from the liquid. This Drzal approach still suffers from the seven (7) major problems described in the Background section, despite the notion that microwave might be more energy efficient as compared to tube furnace heating for the purpose of exfoliating pre-intercalated graphite. In contrast, in the presently invented process, microwave energy is switched on as soon as graphite is poured into and uniformly dispersed in a solution. Since no pre-intercalation or pre-oxidation is involved, we can save 5-120 hours of graphite intercalation/oxidation time.

It is also significant to understand that Drzal's GICs are identical to the GICs obtained by all prior art processes and necessarily contain sulfuric acid and nitric acid in the inter-graphene spaces and, hence, necessarily involve the decomposition of $H_2SO_4$ and $HNO_3$ to produce volatile gases (e.g. $NO_x$ and $SO_x$) during their subsequent microwave energy-assisted, thermal exfoliation process. The $NO_x$ and $SO_x$ are highly regulated species that can potentially pose some environmental issues. In contrast, our new process does not involve exposing GIC to a high temperature and, hence, does not generate any of these volatile species. Clearly, the presently invented process is not an obvious variant of the microwave energy-assisted thermal exfoliation of GIC. The GIC and exfoliated graphite have a long history (>50 years) and over such a long period of time, the prior art workers have always believed that thermal exfoliation of graphite must go through a tedious chemical intercalation/oxidation of graphite. The need to use combined strong acids and oxidizers to intercalate and oxidize graphite for an extended period of time to produce the so-called GIC or "expandable graphite" is now completely avoided.

Additionally, our new process does not require a mixture of concentrated sulfuric acid and fuming nitric acid and/or potassium permanganate. These are very surprising and have defied the expectations of those who work in exfoliated graphite or graphene industry. Furthermore, no subsequent high temperature exposure for exfoliation is required since exfoliated graphite or graphene is directly produced with a simple microwave irradiation of graphite in the presence of a select solution containing a certain type of metal salt (particularly lithium salt or sodium salt) dissolved in certain type of liquid medium.

Although the mechanisms remain poorly understood, this revolutionary process of the present invention appears to essentially combine the required functions of graphene plane expansion, intercalant penetration, exfoliation, and separation of graphene sheets from one another into one single step. The whole process can take less than 10 minutes. This is absolutely stunning, a shocking surprise to even those top scientists and engineers or those of extraordinary ability in the art.

The frequency of microwave or radio frequency irradiation that can be used for practicing the instant invention does not have to be 2.45 GHz, which is used in a domestic microwave oven. Preferably, the frequency is between 1 and 20 GHz and more preferably between 2 and 10 GHz.

In summary, an embodiment of the present invention is a method of producing graphene directly from a non-intercalated and non-oxidized graphitic material. The method comprises: (a) dispersing a graphitic material in a liquid solution to form a suspension, wherein the graphitic material has never been previously exposed to chemical intercalation or oxidation; and (b) subjecting the suspension to microwave or radio frequency irradiation with a frequency and an intensity for a length of time sufficient for producing graphene; wherein the liquid solution contains a metal salt dissolved in water, organic solvent, ionic liquid solvent, or a combination thereof.

The metal salt preferably contains a metal halide or an alkali metal salt containing F, Cl, Br, I, B, or N element. In certain preferred embodiments, the metal salt may contain a metal halide selected from the group consisting of MCl (M=Li, Na, K, Cs), MCl, (M=Zn, Ni, Cu, Mn), MCl$_3$ (M=Al, Fe, Ga), MCl$_4$ (M=Zr, Pt), MF$_2$ (M=Zn, Ni, Cu, Mn), MF$_3$ (M=Al, Fe, Ga), MF$_4$ (M=Zr, Pt), and combinations thereof. We have unexpectedly discovered that the presence of a halogen ion (e.g. $F^+$, $Cl^+$, $Br^+$, and $I^+$) seems to be effective in promoting intercalation of chemical species into spaces between graphene planes and exfoliation, and separation of graphene planes or graphene sheets. The reason behind the ability of this particular group of salt in a liquid medium to promote graphene production is not yet clear.

In certain preferred embodiments, the metal salt includes an alkali metal salt selected from lithium perchlorate (LiClO$_4$), sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), a sodium ionic liquid salt, lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

Preferably, the organic solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, or a combination thereof.

The preferred salt concentration in the liquid medium is from 0.01M to 10 M, more preferably from 0.1 M to 3.5 M, and most preferably from 0.5 M to 2.0 M.

The starting graphitic material may be selected from natural graphite, amorphous graphite (graphite materials containing micro-scaled graphite crystallites, typically 0.1-1.0 μm), synthetic graphite, highly oriented pyrolytic graphite, meso-carbon micro-bead, graphitized meso-phase carbon, needle coke, carbon fiber, graphite fiber, carbon nano-fiber, graphitic nano-fiber, graphite fluoride, chemically modified graphite, expanded graphite, or a combination thereof.

It has been commonly believed that a combination of an intercalant and an oxidizer is required to obtain a proper graphite intercalation compound (GIC) or graphite oxide (GO). This belief has been based on the notion that sulfuric acid serves as an intercalant that penetrates into inter-graphene spaces and stays therein when the intercalation/oxidation procedure is completed and the powder is recovered by drying. In the meantime, the oxidizing agent serves to oxidize the edge and then the interior of graphene planes, effectively increasing the inter-graphene space or opening up the space to facilitate the entry of sulfuric acid. The interstitial sulfuric acid keeps the space open, allowing the oxidizing agent to further oxidize the graphene planes. Upon removal of excess chemicals, the recovered or dried powder is graphite intercalation compound (GIC) or graphite oxide (GO). The residual chemicals (sulfuric acid and nitric acid) in the dried GIC powder get thermally decomposed during the subsequent high-temperature treatment (heat shock exposure), resulting in the formation of volatile gases in the inter-graphene spaces. These gases, under a high temperature, produce very high pressures that push open graphene planes (expansion and exfoliation). In other words, sulfuric acid and the oxidizer are believed to work in a concerted manner to enable the intercalation and oxidation, both the intercalant and the oxidizer being indispensable. The present invention defies this expectation in many aspects: (a) Strong acids, such as sulfuric acid, are not required; (b) Strong oxidizing liquids are not required; and (c) Select metal salts can work well.

From the environmental protection perspective, the practice of mixing two or three undesirable chemicals together (e.g. mixing sulfuric acid, nitric acid, and/or potassium permanganate) can be troublesome since it would make the recovery, separation, and re-use of chemicals so much more difficult. This is more than just a cost issue, but a larger environmental and societal issue and an industrial scalability issue. The significance of our surprising discovery to use more environmentally benign chemicals should not be underestimated or ignored.

Quite significantly, the microwave exposure time can be less than 50 minutes, often less than 30 minutes, or even less than 10 minutes. The microwave exposure step may be followed by a step of subjecting the exfoliated graphite to a mechanical shearing treatment to produce a graphene material. The mechanical shearing treatment comprises using air milling, air jet milling, ball milling, rotating-blade mechanical shearing, ultrasonication, cavitation, or a combination thereof. The graphene may be compressed to form a flexible graphene paper product or a metal-doped graphene product.

In certain embodiments, the microwave exposure step may be carried out simultaneously with a step of subjecting the irradiated graphite to a mechanical shearing treatment to produce a graphene material. The mechanical shearing treatment comprises using ball milling, rotating-blade mechanical shearing, ultrasonication, cavitation, or a combination thereof.

In certain embodiments, the microwave exposure step may be carried out in an inert gas atmosphere, in vacuum, or in a pressurized vessel.

In another embodiment, the dispersion solution can be circulated through the microwave field more than once. Optionally, a size separation method such as hydrocyclone, gravity sedimentation, centrifugation, or filtration can be used to preferentially treat a selected size range of particles in the dispersion.

Another surprising result of the present study is the observation that a wide variety of carbonaceous and graphitic materials can be directly microwave-irradiated in the presence of an intercalating agent. This material may be selected from natural graphite, synthetic graphite, meso-carbon micro-beads (MCMBs), highly oriented pyrolytic graphite, meso-phase carbon, graphite fiber, graphitic nano-fiber, graphite oxide, graphite fluoride, chemically modified graphite, exfoliated graphite, or a combination thereof. This is surprising based on the observation that several types of graphitic materials (e.g. carbon fibers, graphite fibers, carbon nano-fibers, etc.) have a hard-shell structure enclosing a core structure composed of stacks of graphene sheets. These hard skins are known to be highly impermeable to chemicals. This is in contrast to the natural graphite and some artificial graphite that have graphene edges exposed to chemicals and permeable to chemicals.

The presently invented process is capable of producing single-layer graphene sheets. In many examples, the graphene material produced contains at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content no less than 95% by weight, or functionalized graphene.

The graphene sheets produced remain dispersed in the metal salt solution to form a slurry that can be used in a battery or supercapacitor. The slurry can become part of a supercapacitor or battery (e.g. a lithium battery if the metal salt contains a lithium salt or a sodium battery if the metal salt contains a sodium salt. Since graphene sheets are an electrode active material in a supercapacitor, the slurry can be packed into an electrode.

For comparison, Sample 1C was prepared in the following manner: Twenty mg of artificial graphite as used in Example 1A was dispersed in a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated in a tube furnace at 900° C. for 45 seconds.

Graphite fibers were chopped into segments with 0.1 mm or smaller in length prior to being immersed in a liquid medium, and the resulting suspension was then exposed to microwave irradiation for 3-30 minutes. The diameter of carbon fibers was approximately 12 μm. The process resulted in the formation of ultra-thin NGPs.

A powder sample of carbon nano-fibers was supplied from Applied Science, Inc. (ASI), Cedarville, Ohio. In one example, approximately 2 grams of CNFs were immersed in a lithium salt solution (Table 1). Portion of the resulting suspension was exposed to microwave irradiation for 2-10 minutes. The process produced ultra-thin NGPs >90% being single-layer graphene.

TABLE 1

Production of graphene from various sources and chemicals.

| Sample No. | Metal salt | Liquid medium | Graphitic material | Microwave/ RF conditions | Comments |
|---|---|---|---|---|---|
| 1-A | $LiPF_6$ | PC | Natural graphite | 5-15 min | |
| 1-C | — | $H_2SO_4 + HNO_3 +$ $KMnO_4$ | Natural graphite | 24 hours | Conventional GO/GIC |
| 2-A | $NaBF_4$ | PC + EC | CNF | 2-10 min | |
| 2-B | $NaBF_4$ | PC + VC | CNF | 2-10 min | |
| 3-A | $LiPF_3(CF_2CF_3)_3$ | DEC | MCMB | 5-25 min | |
| 3-B | $LiPF_3(CF_2CF_3)_3$ | PC + DEC | MCMB | 3-15 min | |
| 4-A | KCl + NaF | Water | Artificial graphite | 10-45 min | |
| 4-B | NaF | Water | Artificial graphite | 12-45 min | |
| 5-A | $AlCl_3$ | EMIC | MCMB | 20-50 min | Ionic liquid |
| 5-B | $AlF_3$ | EMIC | MCMB | 10-35 min | Ionic liquid |
| 6-A | $NaPF_6$ | DOL + DME | CNF | 2-10 min | |
| 6-B | $NaPF_6$ | DOL + DME | Graphite fibers | 12-45 min | |
| 6-C | $NaPF_6$ | DOL + DME | MWCNT | 4-15 min | |
| 6-D | $NaPF_6$ | DOL + DME | Natural graphite | 10-45 min | |
| 6-E | $NaPF_6$ | DOL + DME | Needle coke | 5-15 min | |
| 6-F | — | $H_2SO_4 +$ $KMnO_4$ | Needle coke | 24 hours | Conventional GO/GIC |

\* EMIC = 1-ethyl-3-methylimidazolium chloride;
PC = propylene carbonate;
EC = ethylene carbonate;
VC = vinyl acetate; Household microwave ovens used.

The following examples serve to provide the best modes of practice for the present invention and should not be construed as limiting the scope of the invention:

Examples 1-6: Graphene Sheets (NGPs) from Various Graphitic Materials

As an example, 20 mg of meso-phase pitch-derived artificial graphite of approximately 20 μm in size were used in the preparation of Sample 1-A (microwave irradiation) and 1-C (conventional GO/GIC approach), respectively, under the processing conditions and lengths of time as specified in Table 1 below.

The graphene sheets obtained in each sample were examined using atomic force microscopy (AFM), transmission electron microscopy (TEM), and scanning electron microscopy (SEM) to determine their thickness (number of layers) and lateral dimensions (length and width). The graphene sheets suspended in water were cast onto a glass plate to form a thin film (2-5 μm thick) from each sample. The electrical conductivity of the thin film was measured using the four-point probe method. We have also investigated the production yield of each process by comparing the initial graphite material weight with the final graphene material weight. This is significant since we surprisingly observed that conventional Hummer's method of producing graphene involves consumption of graphite, perhaps due to oxidation of carbon in the graphite structure to form carbon dioxide during the chemical oxidation/intercalation process. The reaction of graphite with oxygen to form $CO_2$ means that a significant proportion of graphite is lost. The experimental data are summarized in Table 2 below.

TABLE 2

Characteristics of graphene produced by different methods.

| Sample No. | Lateral dimensions | No. of graphene layers | Conductivity of thin film (S/cm) | Production yield |
|---|---|---|---|---|
| 1-A | 5-15 μm | 1-3 | 5560 | 98% |
| 1-C | 0.3-1.2 μm | 1-3 | $2.5 \times 10^{-3}$ S/cm (un-reduced); 560 S/cm (reduced); | 70% |
| 2-A | 0.12-0.5 μm | Mostly 1 | 2520 | 99% |
| 2-B | 0.12-0.4 μm | Mostly 1 | 2550 | 99% |
| 3-A | 3-10 μm | 3-10 | 4342 | 99% |
| 3-B | 3-10 μm | 1-5 | 4328 | 99% |
| 4-A | 2-5 μm | 3-10 | 5015 | 95% |
| 4-B | 2-5 μm | 5-10 | 5008 | 93% |
| 5-A | 3-11 μm | 3-7 | 4337 | 97% |
| 5-B | 3-11 μm | 1-5 | 4320 | 97% |
| 6-A | 0.12-0.5 μm | 1-3 | 2465 | 99% |
| 6-B | 0.6-2.5 μm | 3-5 | 3837 | 95% |
| 6-C | 0.1-0.5 μm | 1-5 | 3668 | 96% |
| 6-D | 3-11 μm | 5-10 | 4546 | 94% |
| 6-E | 2-5 μm | 1-5 | 4488 | 96% |
| 6-F | 0.35-0.6 μm | 3-6 | 572 (after reduction) | 68% |

These data nave clearly demonstrated the superiority of the presently invented direct microwave irradiation method of producing graphene materials over conventional chemical oxidation/intercalation method. Both methods are capable of producing single-layer graphene, but our presently invented method produces graphene sheets that are typically wider, longer, and much more electrically conducting. The conventional Hummer's method and all other chemical oxidation/intercalation method necessarily involve highly oxidizing the graphitic material, creating damage (defects) to the resulting graphene sheets that could never be repaired or recovered (smaller lateral dimensions. Even after heavy chemical reduction with hydrazine, the graphene material (a reduced graphene oxide) still exhibits an electrical conductivity one order of magnitude lower than that of the more pristine graphene produced by the present direct microwave irradiation method.

The invention claimed is:

1. A method of producing graphene directly from a non-intercalated and non-oxidized graphitic material, said method comprising:
   (a) dispersing said graphitic material in a liquid solution to form a suspension, wherein said graphitic material has never been previously exposed to chemical intercalation or oxidation; and
   (b) subjecting said suspension to microwave or radio frequency irradiation with a frequency and an intensity for a length of time sufficient for producing said graphene;
   wherein said liquid solution contains a metal salt dissolved in water, organic solvent, ionic liquid solvent, or a combination thereof, wherein said liquid solution has a salt concentration from 0.01 M to 10 M;
   wherein said method does not include strong acids.

2. The method of claim 1, wherein said metal salt is a metal halide selected from the group consisting of MCl (M=Li, Na, K, Cs), $MCl_2$ (M=Zn, Ni, Cu, Mn), $MCl_3$ (M=Al, Fe, Ga), $MCl_4$ (M=Zr, Pt), $MF_2$ (M=Zn, Ni, Cu, Mn), $MF_3$ (M=Al, Fe, Ga), $MF_4$ (M=Zr, Pt), and combinations thereof.

3. The method of claim 1, wherein said metal salt includes an alkali metal salt selected from lithium perchlorate ($LiClO_4$), sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), a sodium ionic liquid salt, lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulphonyl)imide, lithium bis (fluorosulphonyl)imide, lithium trifluoromethanesulfonimide (LiTFSI), an ionic liquid lithium salt, or a combination thereof.

4. The method of claim 3, wherein said organic solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, or a combination thereof.

5. The method of claim 1 wherein said graphitic material is selected from natural graphite, synthetic graphite, amorphous graphite, highly oriented pyrolytic graphite, mesocarbon micro-bead, graphitized meso-phase carbon, needle coke, carbon fiber, graphite fiber, carbon nano-fiber, graphitic nano-fiber, graphite fluoride, chemically modified graphite, expanded graphite, or a combination thereof.

6. The method of claim 1 wherein said microwave or radio frequency irradiation time is from 1 minute to 60 minutes.

7. The method of claim 1 wherein said microwave or radio frequency irradiation time is less than 30 minutes.

8. The method of claim 1 wherein said microwave or radio frequency irradiation time is less than 10 minutes.

9. The method of claim 1, wherein said microwave or radio frequency irradiation is followed by a mechanical shearing treatment to produce a thinner or smaller graphene material.

10. The method of claim 9, wherein said mechanical shearing treatment comprises using air milling, air jet milling, ball milling, rotating-blade mechanical shearing, ultrasonication, cavitation, or a combination thereof.

11. The method of claim 1, wherein said liquid solution further comprises a chemical functionalizing agent and said microwave or radio frequency irradiation activates a chemical reaction between said agent and said graphene to produce a chemically functionalized graphene material.

12. The method of claim 1 wherein said graphene contains single-layer graphene sheets.

13. The method of claim 1 wherein said graphene contains at least 80% single-layer graphene sheets.

14. The method of claim 1 wherein said graphene contains pristine graphene, oxidized graphene with less than 5% oxygen content by weight, graphene fluoride, graphene fluoride with less than 5% fluorine by weight, graphene with a carbon content no less than 95% by weight, or functionalized graphene.

15. A slurry containing said metal salt solution and graphene sheets created by the process of claim 1.

16. A supercapacitor, sodium battery, or lithium battery containing the slurry of claim 15.

17. A method of producing graphene directly from a non-intercalated and non-oxidized graphitic material, said method comprising:
(a) dispersing said graphitic material in a liquid solution to form a suspension, wherein said graphitic material has never been previously exposed to chemical intercalation or oxidation; and
(b) subjecting said suspension to microwave or radio frequency irradiation;
wherein said liquid solution contains a metal salt, excluding lithium salt, aluminum salt, iron salt, copper salt, sodium salt, or a combination thereof, dissolved in water, organic solvent, ionic liquid solvent, or a combination thereof wherein said microwave or radio frequency irradiation time is from 1 minute to 60 minutes.

\* \* \* \* \*